(12) United States Patent
Fan et al.

(10) Patent No.: US 12,538,446 B2
(45) Date of Patent: Jan. 27, 2026

(54) CARD CONNECTING ASSEMBLY AND AN ELECTRONIC CARD MOUNTING STRUCTURE THEREOF

(71) Applicant: Jabil Circuit (Singapore) Pte. Ltd., Singapore (SG)

(72) Inventors: Hsun-Wei Fan, Taichung (TW); Chen-Hsuan Hsu, Taichung (TW); Chung-Ju Wang, Taichung (TW); Yu-Ming Lin, Taichung (TW)

(73) Assignee: Jabil Circuit (Singapore) Pte. Ltd., Singapore (SG)

( * ) Notice: Subject to any disclaimer, the term of this patent is extended or adjusted under 35 U.S.C. 154(b) by 104 days.

(21) Appl. No.: 18/599,640

(22) Filed: Mar. 8, 2024

(65) Prior Publication Data
US 2024/0389260 A1 Nov. 21, 2024

(30) Foreign Application Priority Data
May 17, 2023 (CN) .......................... 202321189108.0

(51) Int. Cl.
*H05K 7/14* (2006.01)
*G06F 1/18* (2006.01)

(52) U.S. Cl.
CPC ........... *H05K 7/1489* (2013.01); *G06F 1/183* (2013.01); *H05K 7/1402* (2013.01)

(58) Field of Classification Search
CPC .. H05K 7/1489; H05K 7/1402; H05K 7/1461; H05K 7/12; H05K 7/1401; G06F 1/183; H01R 13/635; H01R 13/62927; H01R 13/62988; H01R 13/62994; H01R 12/721
See application file for complete search history.

(56) References Cited

U.S. PATENT DOCUMENTS

| | | | |
|---|---|---|---|
| 6,855,009 B2* | 2/2005 | Nishiyama | H01R 12/721 439/325 |
| 9,735,485 B2* | 8/2017 | Schulze | H01R 12/721 |
| 10,321,583 B2* | 6/2019 | Seo | H04N 5/64 |
| 11,032,932 B1 | 6/2021 | Chen | |
| 2008/0220637 A1* | 9/2008 | Guan | H01R 13/6273 439/157 |

* cited by examiner

*Primary Examiner* — Allen L Parker
*Assistant Examiner* — Peter Krim
(74) *Attorney, Agent, or Firm* — Young Basile Hanlon & MacFarlane, P.C.

(57) ABSTRACT

A card connecting assembly mountable on a circuit board for insertion of an electronic card includes a card connector disposed on the circuit board, and an electronic card mounting structure having first and second guiderails for the electronic card to be slidably insertable thereinto, and a latch mechanism integrally formed and elastically connected with the first guiderail. The latch mechanism includes an operating portion and a latch portion. With the latch portion engaged in the notch when the electronic card is inserted into the card connector to prevent removal thereof. Through the operating portion operably and elastically displaced away from the first guiderail, the latch portion is disengageable from the notch, the electronic card is permitted to be removed from the card connector.

6 Claims, 18 Drawing Sheets

CARD CONNECTING ASSEMBLY AND AN ELECTRONIC CARD MOUNTING STRUCTURE THEREOF

CROSS-REFERENCE TO RELATED APPLICATION

This application claims priority to Chinese Patent Application No. 202321189108.0, filed on May 17, 2023, and incorporated by reference herein in its entirety.

FIELD

The disclosure relates to a card connecting assembly for connecting an electronic card to a circuit board, and more particularly to an electronic card mounting structure with guiderails for pluggably inserting an electronic card into a card connector on a circuit board.

BACKGROUND

As the demand for cloud computing and cloud storage increases, the Open Compute Project (OCP) is developed to make the cloud service industry more efficient and cost-effective. The purpose of the Open Compute Project is to unify the specifications of servers (such as modularizing the electronic components of servers) through sharing software and hardware design of cloud data centers so as to attract more server manufacturers. Hence, in current servers, electronic cards, such as network cards, expansion cards, etc., are mounted in circuit boards through guiderail assemblies with the electronic cards inserted into card connectors so as to modularize the electronic components of servers and facilitate expansion of servers. However, there is no means to prevent misalignment of the electronic card with the card connector and prevent bad contact of circuits, or to prevent loosening of the electronic card from the guiderail assembly.

SUMMARY

Therefore, an object of the disclosure is to provide an electronic card mounting structure that can alleviate at least one of the drawbacks of the prior art.

According to the disclosure, the electronic card mounting structure for pluggably inserting an electronic card into a card connector on a circuit board. The electronic card has at least one notch formed at a side edge thereof. The electronic card mounting structure includes a first guiderail, a second guiderail and a latch mechanism. The first guiderail and the second guiderail are disposed at two sides of the card connector to define a card accommodation space therebetween such that the electronic card is slidably insertable into the first and second guiderails along the side edges to be further inserted into the card connector. The latch mechanism is integrally formed and elastically connected with the first guiderail. The latch mechanism includes an operating portion and a latch portion. The latch portion is configured to be elastically displaced between a locking position, where the latch portion is disposed in the card accommodation space for engagement in the notch of the electronic card, and an unlocking position, where the latch portion is retracted away from the card accommodation space, by the side edge of the electronic card during sliding insertion of the electronic card into the first and second guiderails to permit movement of the side edge over the latch portion and to generate a biasing force when the side edge abuts against the latch portion. The operating portion is connected with the latch portion and is operably and elastically moved away from the card accommodation space in a direction that is away from the first guiderail to displace the latch portion from the locking position to the unlocking position so as to remove the latch portion from the notch.

Another object of the disclosure is to provide a card connecting assembly that can alleviate at least one of the drawbacks of the prior art.

According to the disclosure, the card connecting assembly is mountable on a circuit board for insertion of an electronic card. The electronic card has at least one notch formed at a side edge thereof. The card connecting assembly includes a card connector and an electronic card mounting structure. The card connector is disposed on the circuit board. The electronic card mounting structure includes a first guiderail, a second guiderail and a latch mechanism. The first guiderail and the second guiderail are disposed at two sides of the card connector to define a card accommodation space therebetween such that the electronic card is slidably insertable into the first and second guiderails along the side edges to be further inserted into the card connector. The latch mechanism is integrally formed and elastically connected with the first guiderail. The latch mechanism includes an operating portion and a latch portion. The latch portion is configured to be elastically displaced from a locking position, where the latch portion is disposed in the card accommodation space for engagement in the notch of the electronic card, and an unlocking position, where the latch portion is retracted away from the card accommodation space, by the side edge of the electronic card during sliding insertion of the electronic card into the first and second guiderails to permit movement of the side edge over the latch portion and to generate a biasing force when the side edge abuts against the latch portion. The operating portion is connected with the latch portion and is operably and elastically moved away from the card accommodation space in a direction that is away from the first guiderail to displace the latch portion from the locking position to the unlocking position so as to remove the latch portion from the notch.

With the latch portion engageable in the notch or disengageable from the notch through operation, the electronic card is reliably and stably retained to the card connector to prevent movement relative to the card connector and renders the mounting of the electronic card efficient, accurate and firm.

BRIEF DESCRIPTION OF THE DRAWINGS

Other features and advantages of the disclosure will become apparent in the following detailed description of the embodiment with reference to the accompanying drawings. It is noted that various features may not be drawn to scale.

DETAILED DESCRIPTION

Figure 1:
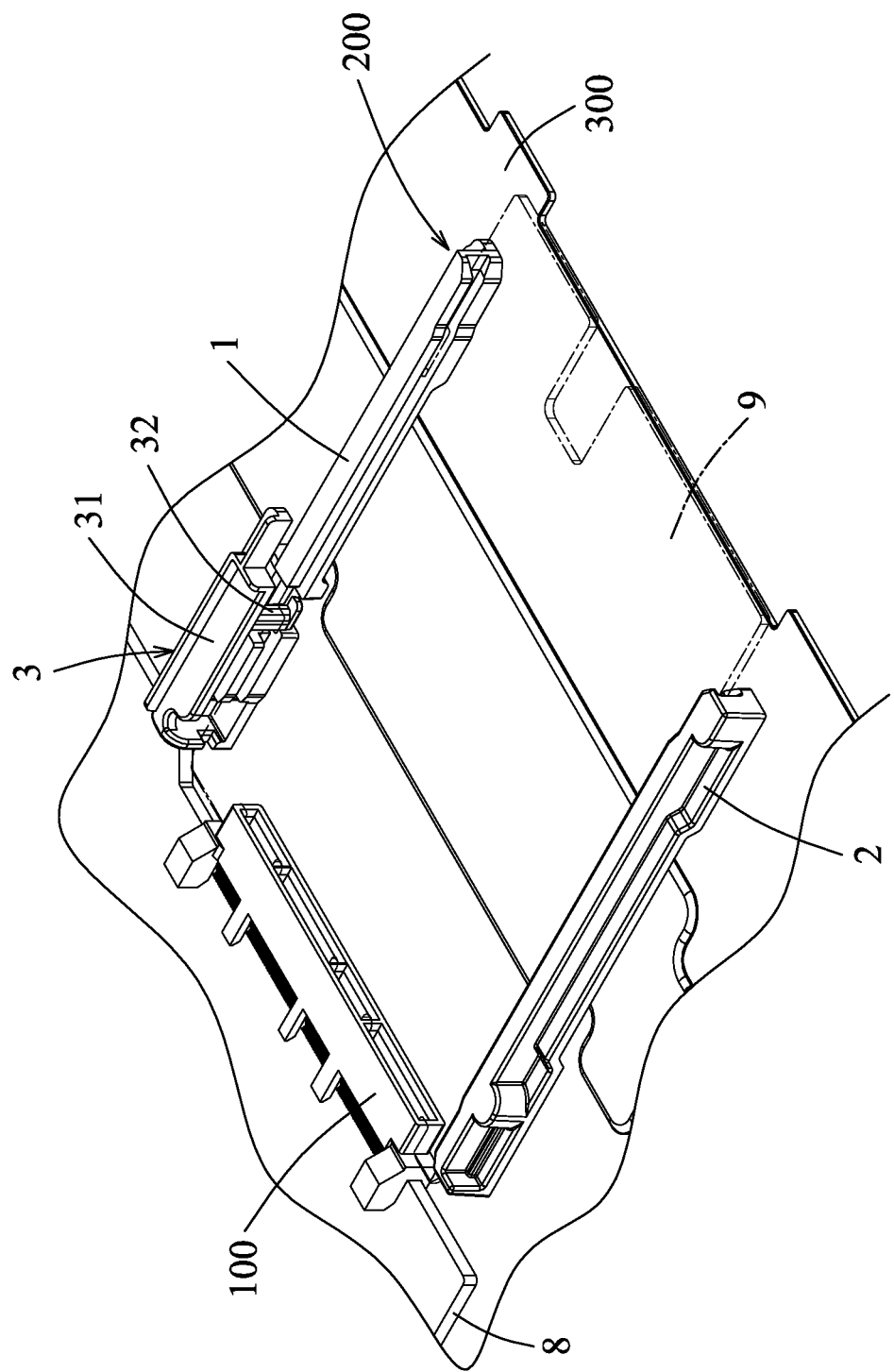
FIG. 1 is a perspective view illustrating an embodiment of a card connecting assembly according to the disclosure for connecting an electronic card with a circuit board.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
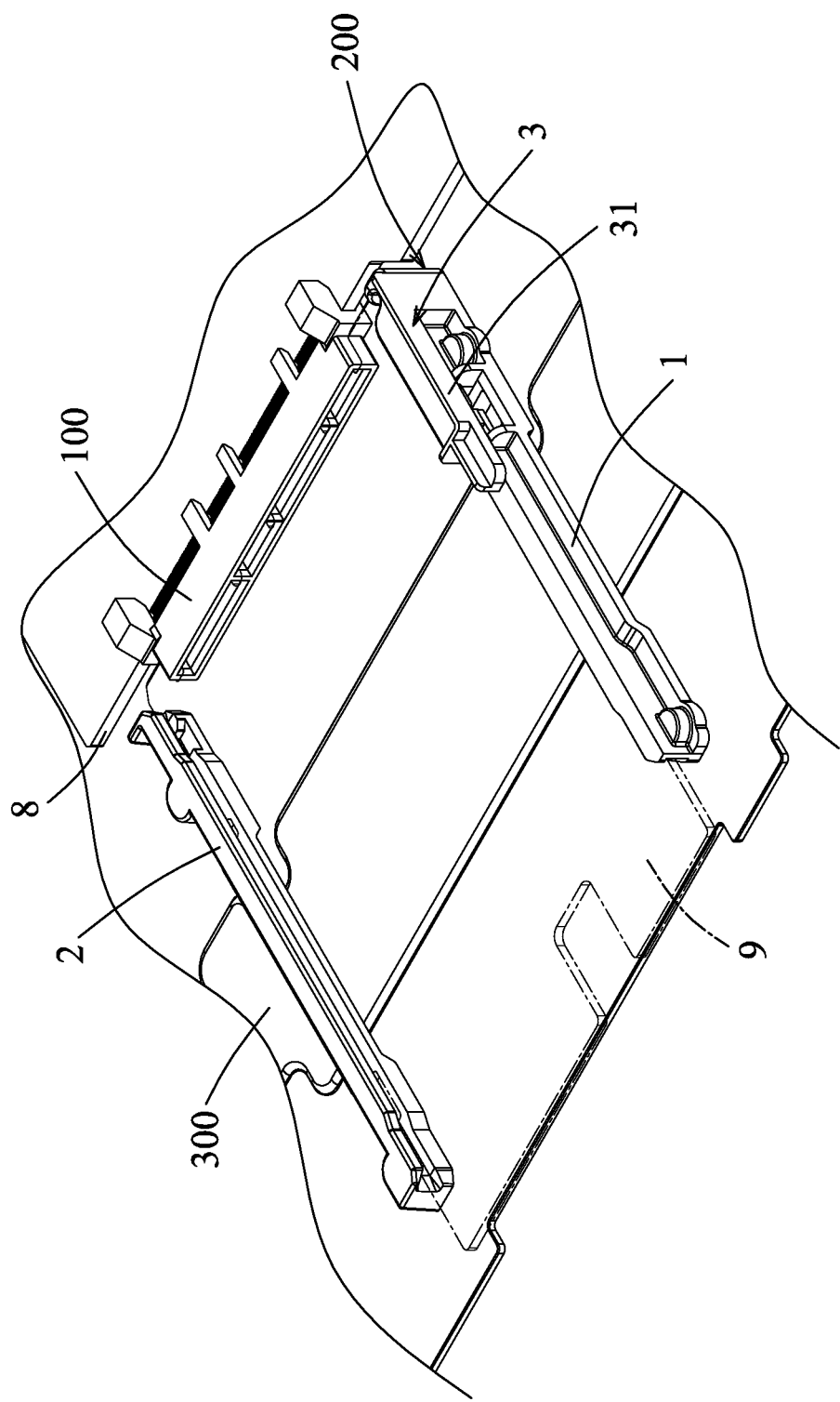
FIG. 2 is a perspective view similar to FIG. 1, taken from another angle.
Figure 3:
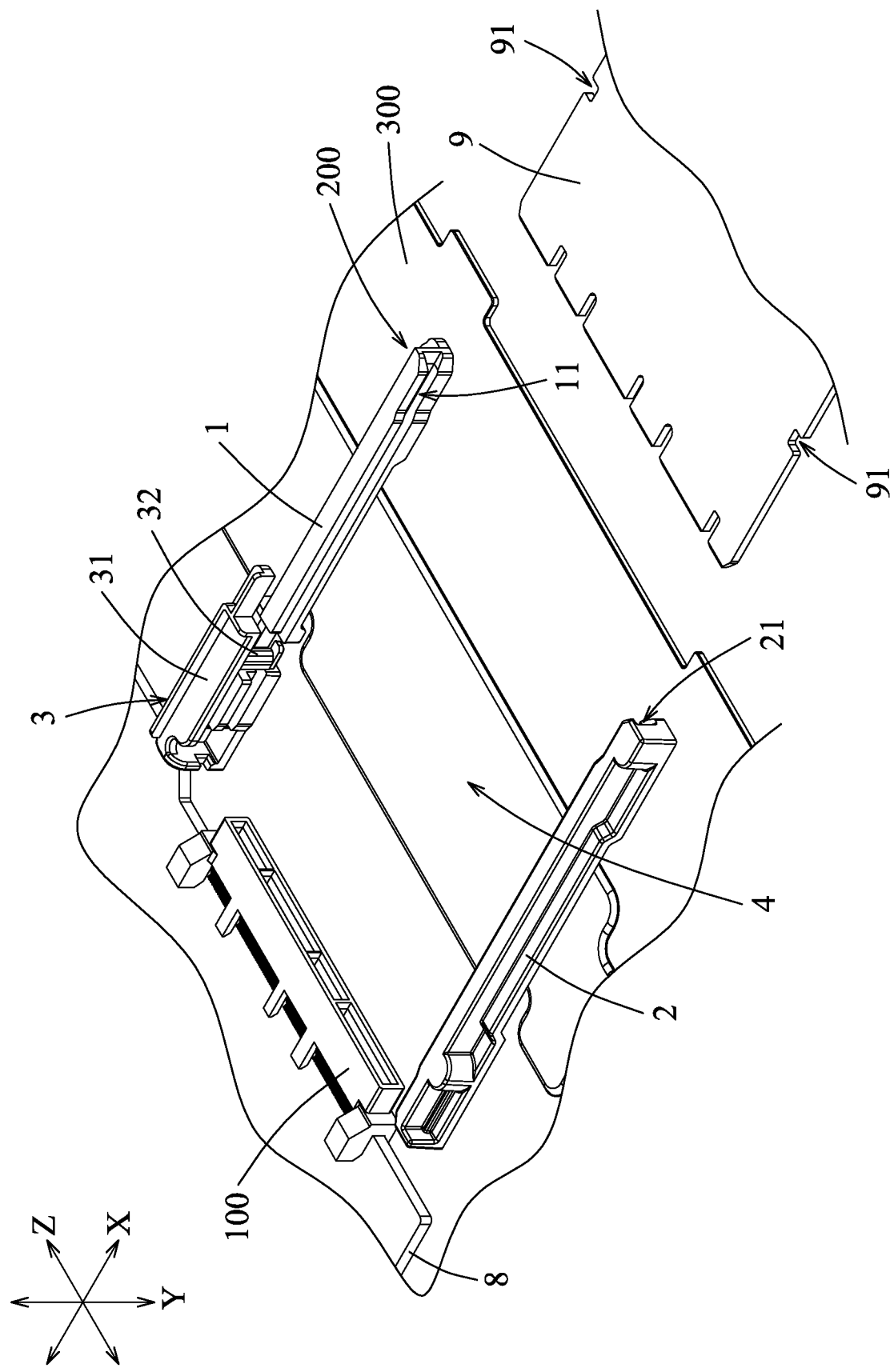
FIG. 3 is a perspective view illustrating the state when the electronic card is to be inserted into the card connecting assembly.

Referring to FIGS. 1 to 3, an embodiment of a card connecting assembly is adapted to be mounted on a circuit board 8 for insertion of an electronic card 9. The electronic card 9, such as an OCP card, has two notches 91 respectively formed at left and right side edges thereof. The number of the notches 91 may be one or more than two as required. The card connecting assembly includes a card connector 100 disposed on a front side of the circuit board 8 and electrically connected with the circuit board 8, and an electronic card mounting structure 200 disposed within a case 300 and forwardly of the card connector 100. The electronic card 9 is electronically connected with the circuit board 8 through the card connector 100.

Figure 4:
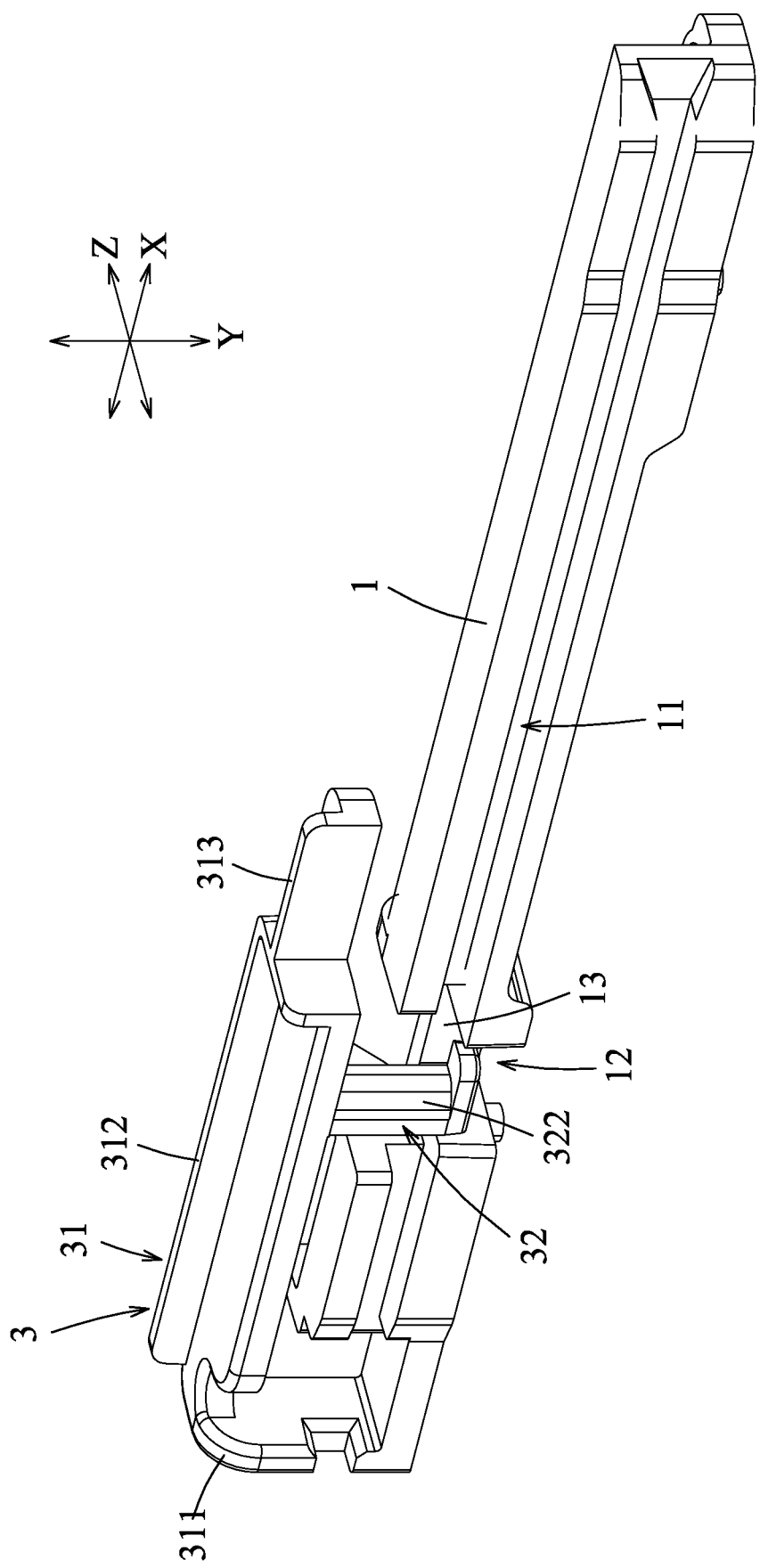
FIG. 4 is a perspective view of a first guiderail and a latch mechanism of the embodiment.
Figure 5:
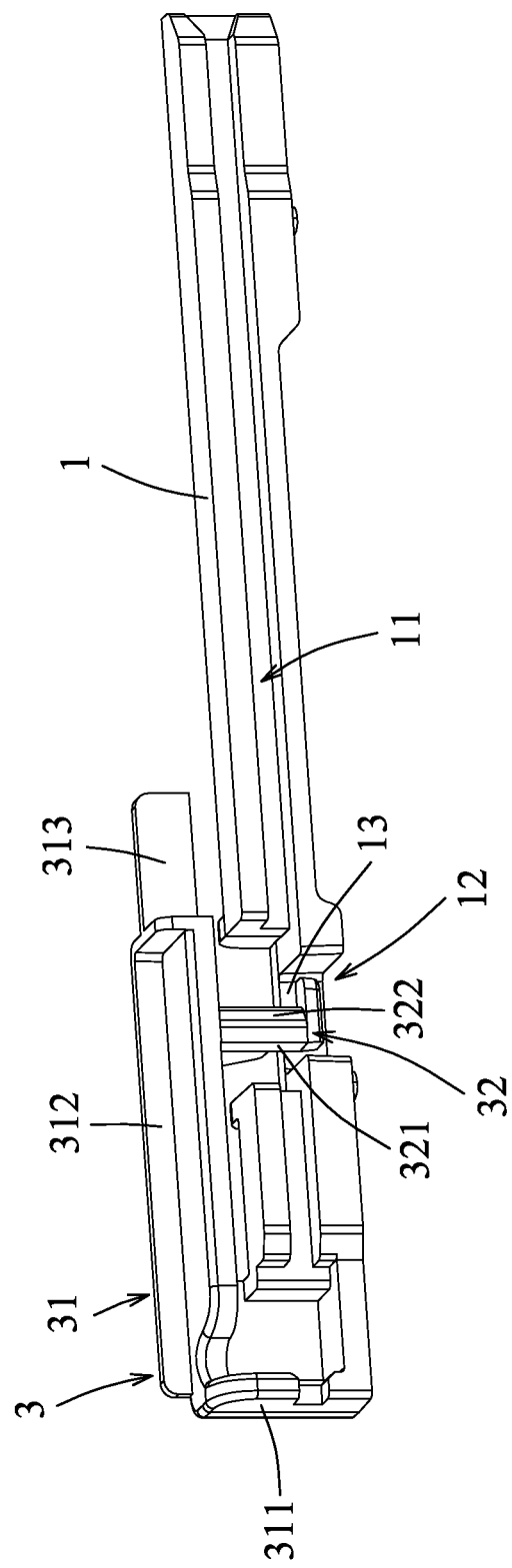
FIG. 5 is a perspective view similar to FIG. 4, taken from another angle.
Figure 6:
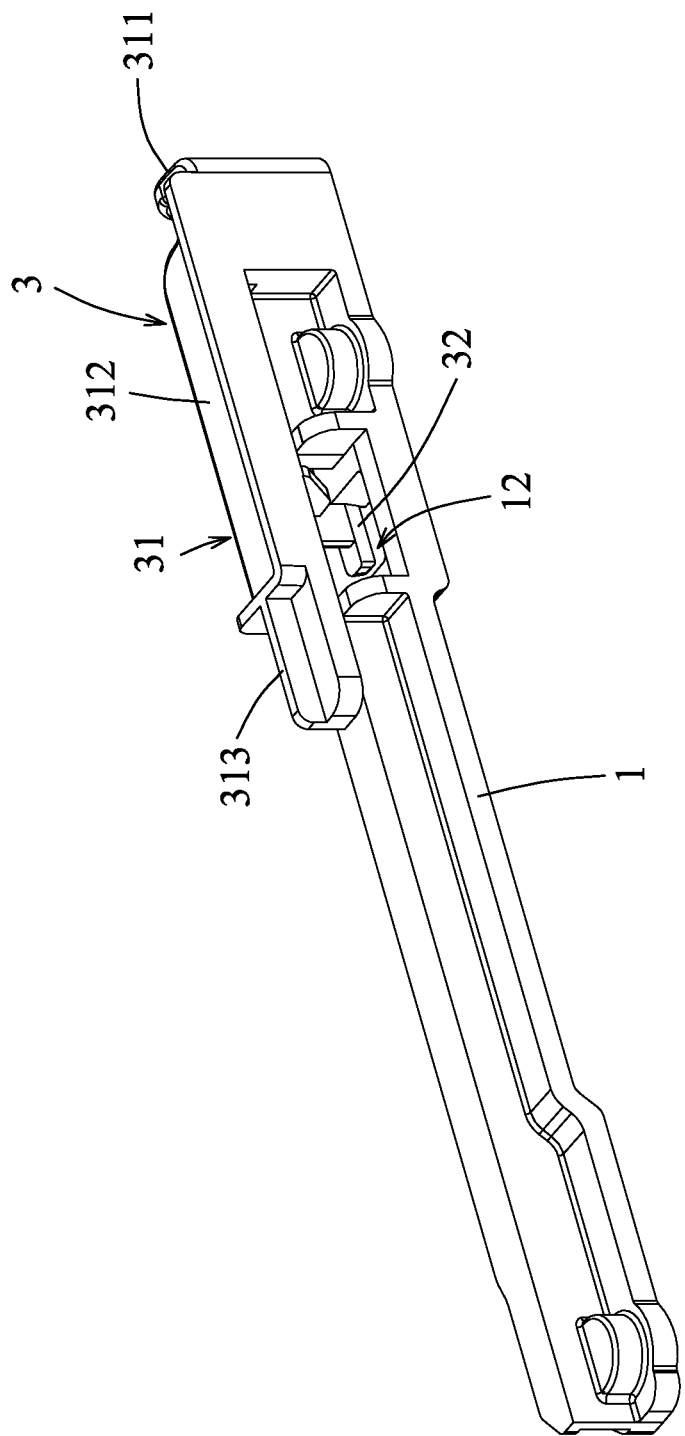
FIG. 6 is a perspective view similar to FIG. 4, taken from another angle.
Figure 14:
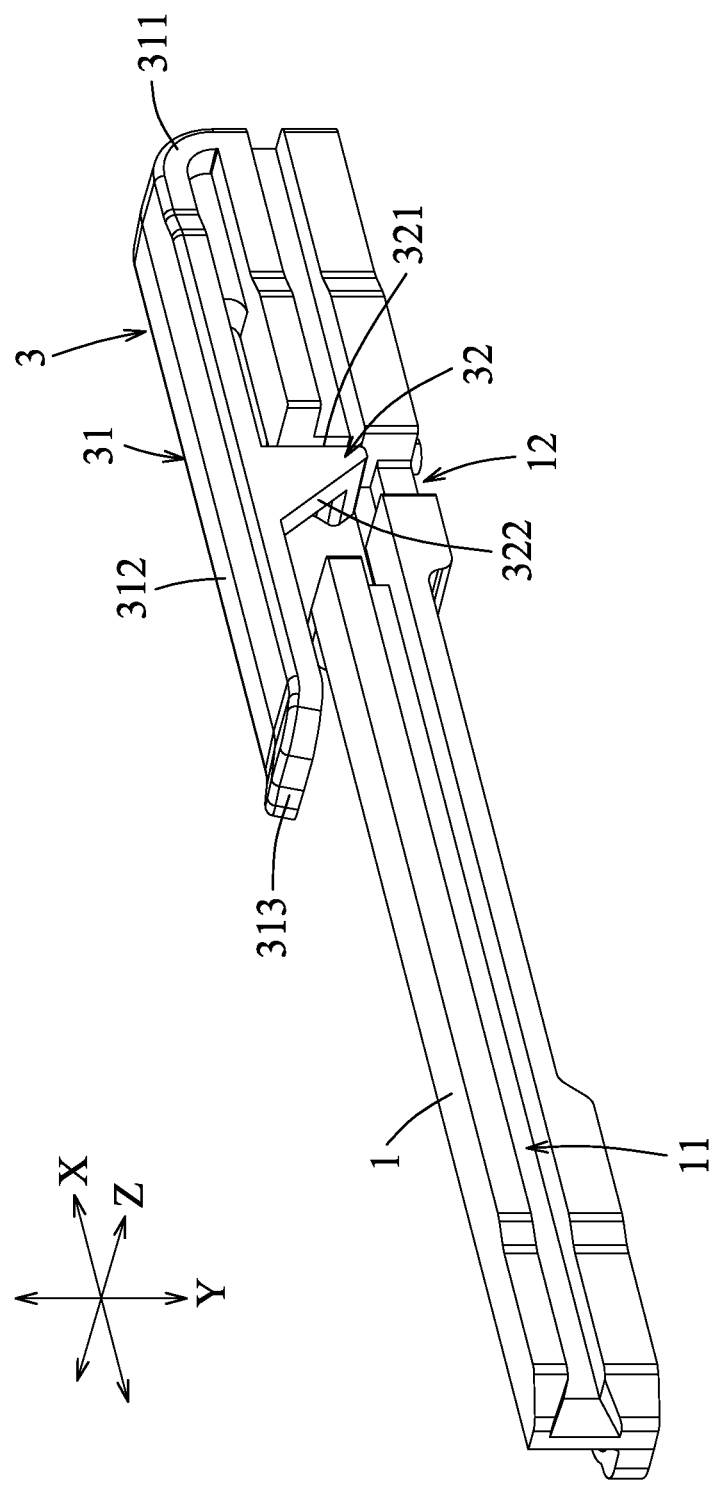
FIG. 14 is a perspective view of a first guiderail and a latch mechanism of another embodiment.
Figure 15:
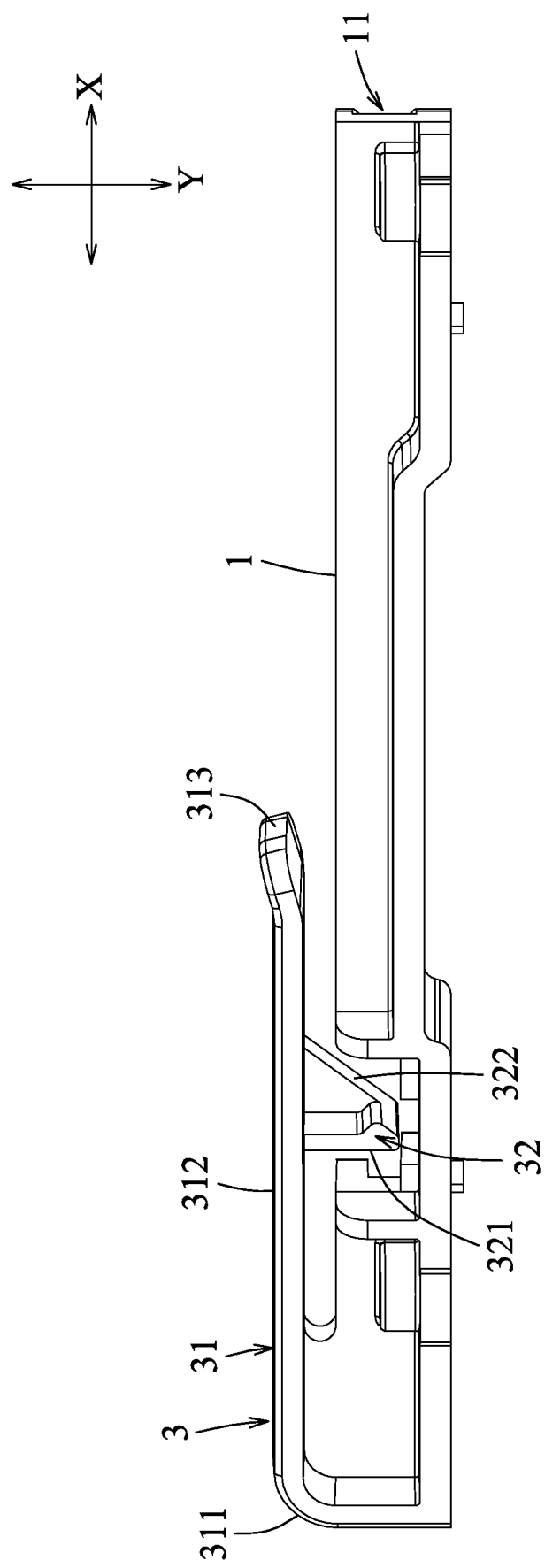
FIG. 15 is a perspective view similar to FIG. 14, taken from another angle.

With reference to FIGS. 3, 4 and 14, the electronic card mounting structure 200 is adapted for pluggably inserting the electronic card 9 into the card connector 100 on the circuit board 8, and includes a first guiderail 1, a second guiderail 2 and a latch mechanism 3. The first guiderail 1 and the second guiderail 2 are disposed at right and left sides of the card connector 100, respectively, to define a card accommodation space 4 therebetween such that the electronic card 9 is slidably insertable into the first and second guiderails 1, 2 along the right and left side edges to be further inserted into the card connector 100. Specifically, the first guiderail 1 has a first channel 11 which is recessed from a side surface facing the second guiderail 2 and which extends in the front-rear direction (X). The second guiderail 2 has a second channel 21 which is recessed from a side surface facing the first guiderail 1 and which extends in the front-rear direction (X). The first and second channels 11, 21 are for slidable insertion of the right and left side edges of the electronic card 9 thereinto so as to guide insertion of the electronic card 9 into the card connector 100. In this embodiment, the first channel 11 is opened leftwardly, and the second channel 21 is opened rightwardly. Alternatively, as shown in FIG. 14, the first guiderail 1 may be disposed at a left side of the card connector 100, and the first channel 11 is opened rightwardly for insertion of the left side edge of the electronic card 9.

With reference to FIGS. 4, 5, 6 and 11, the first guiderail 1 has a slot 12 which is formed in a side adjacent to the first channel 11 and which extends in an up-down direction (Y) to be in communication with the first channel 11. The slot 12 is aligned with the notch 91 at the right side edge of the electronic card 9 when the electronic card 9 is inserted into the card connector 100. In this embodiment, the slot 12 extends through upper and lower ends of the first guiderail 1 and through the first channel 11. Alternatively, the slot 12 may be a blind hole which is closed at an end away from the latch mechanism 3.

Figure 7:
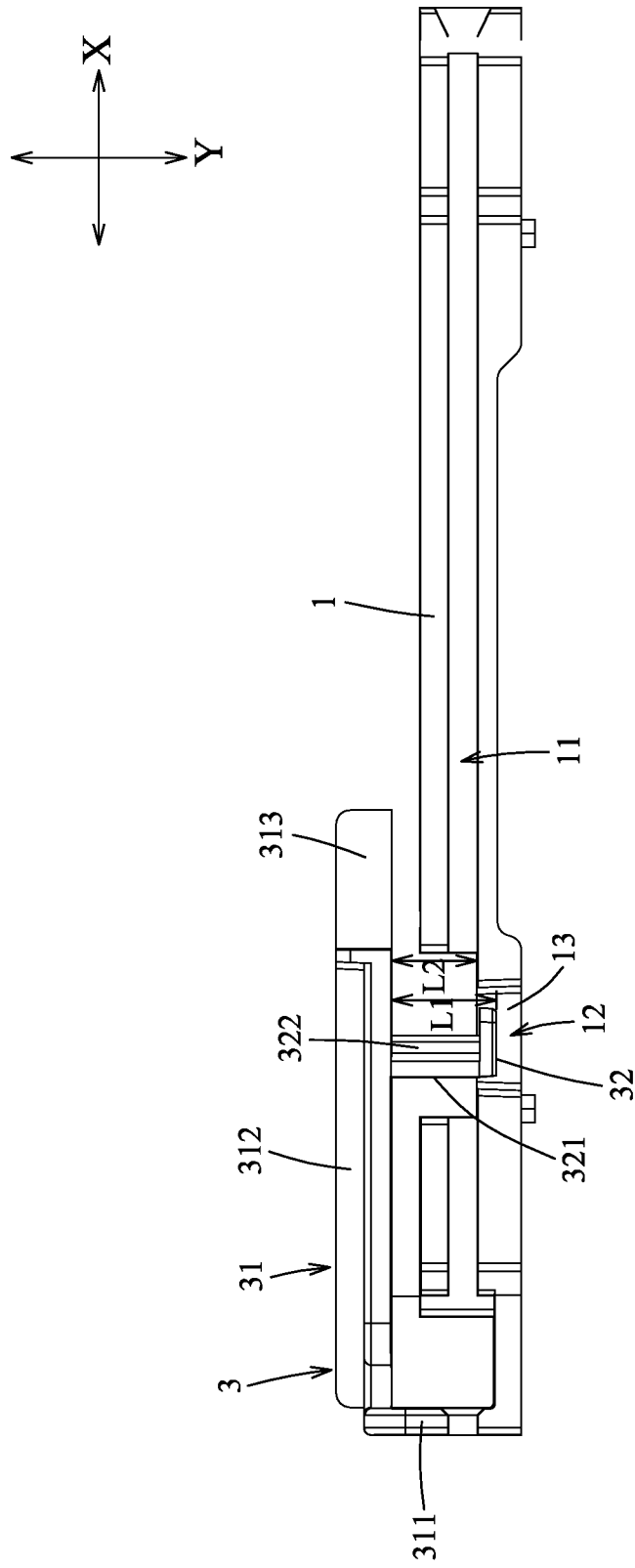
FIG. 7 is a left side view of the first guiderail and the latch mechanism.
Figure 17:
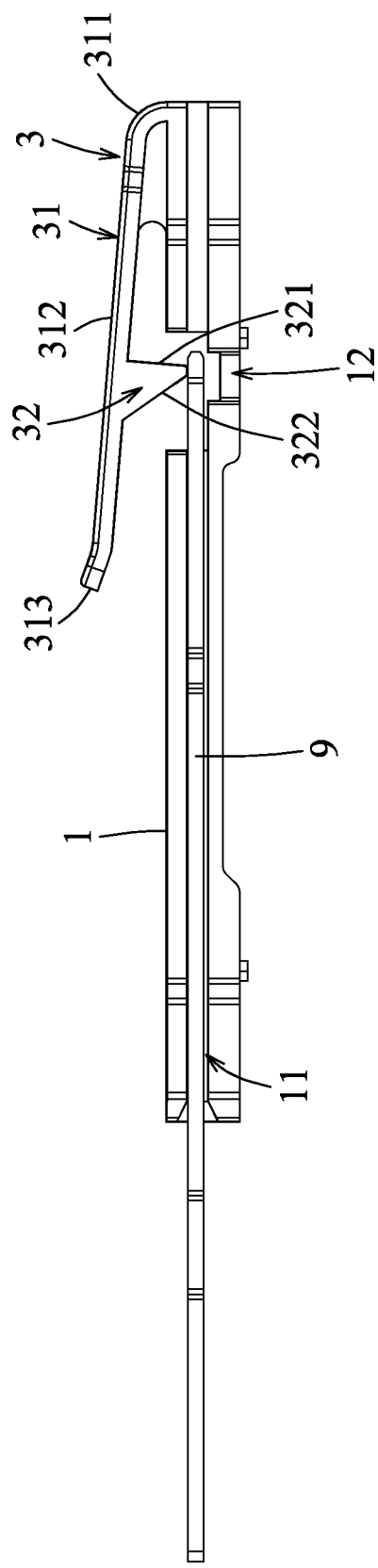

With reference to FIGS. 4 to 7 and FIG. 17, the latch mechanism 3 is integrally formed and elastically connected with the first guiderail 1. In this embodiment, the latch mechanism 3 and the first guiderail 1 are made from an elastomeric material, such as plastic, rubber or other polymer materials. The latch mechanism 3 includes an operating portion 31 connected with the first guiderail 1, and a latch portion 32 connected with the operating portion 31. Specifically, the operating portion 31 has a connecting section 311 which is connected with and extends from the first guiderail 1 in the up-down direction (Y), an extension section 312 which is connected with and extends forwardly from the connecting section 311 to be spaced apart from and along the first guiderail 1, and a handgrip 313 which is connected with and extends from the extension section 312 in the front-rear direction (X) away from the connecting section 311. As shown in FIGS. 7 and 17, the extension section 312 is spaced apart from the first guiderail 1 such that the extension section 312 is elastically displaceable with the connecting section 311 acting as a fulcrum in the front-rear direction (X) (see FIG. 17) or in a left-right direction (Y) (see FIG. 4). In this embodiment, the front-rear direction (X), the up-down direction (Y) and the left-right direction (Z) are perpendicular to one another. The handgrip 313 is provided for a user to grip and operate the operating portion 31.

Figure 8:
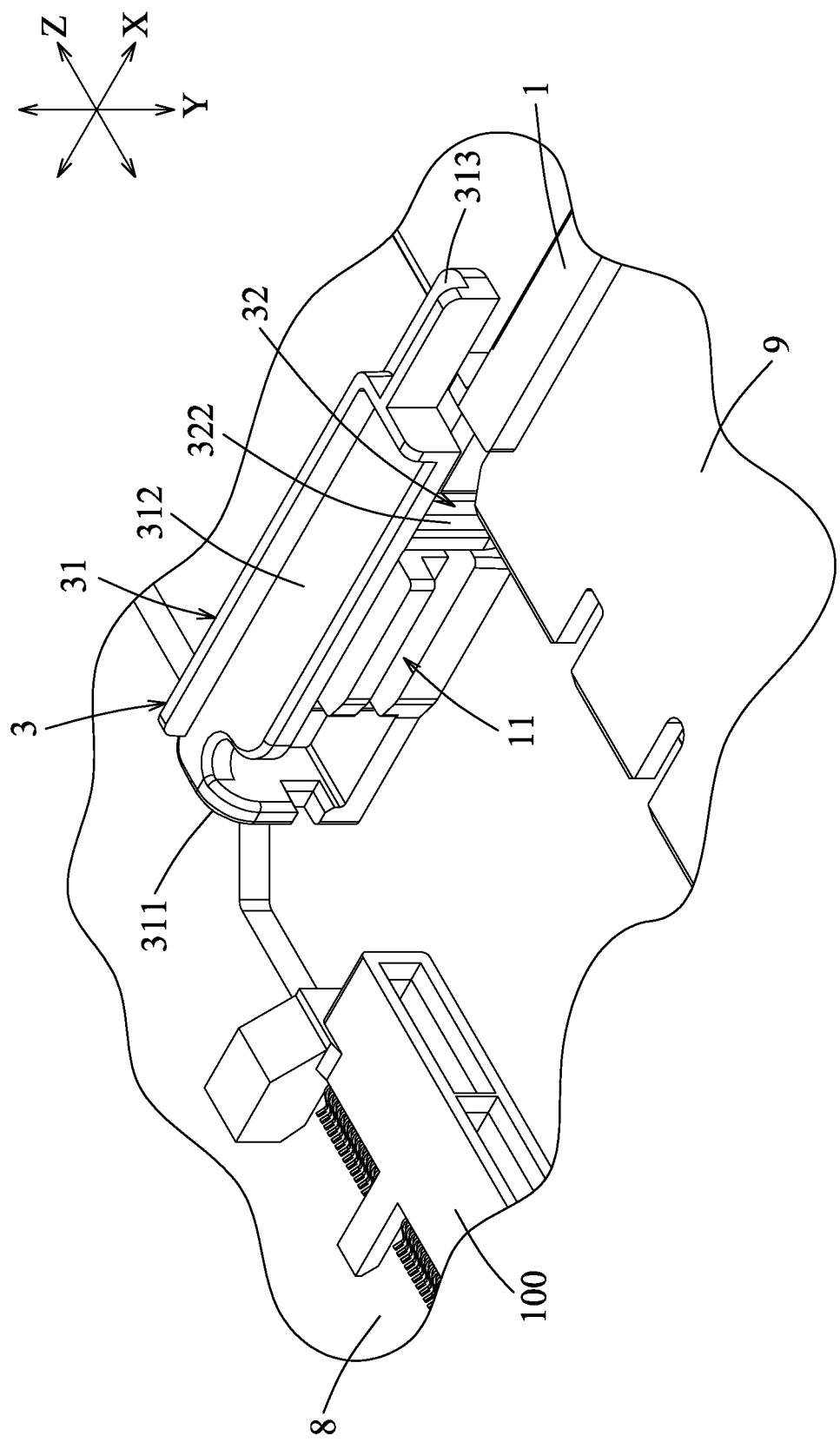
FIGS. 8 and 9 are fragmentary perspective views illustrating the state when the electronic card is being inserted into the card connecting assembly.
Figure 9:
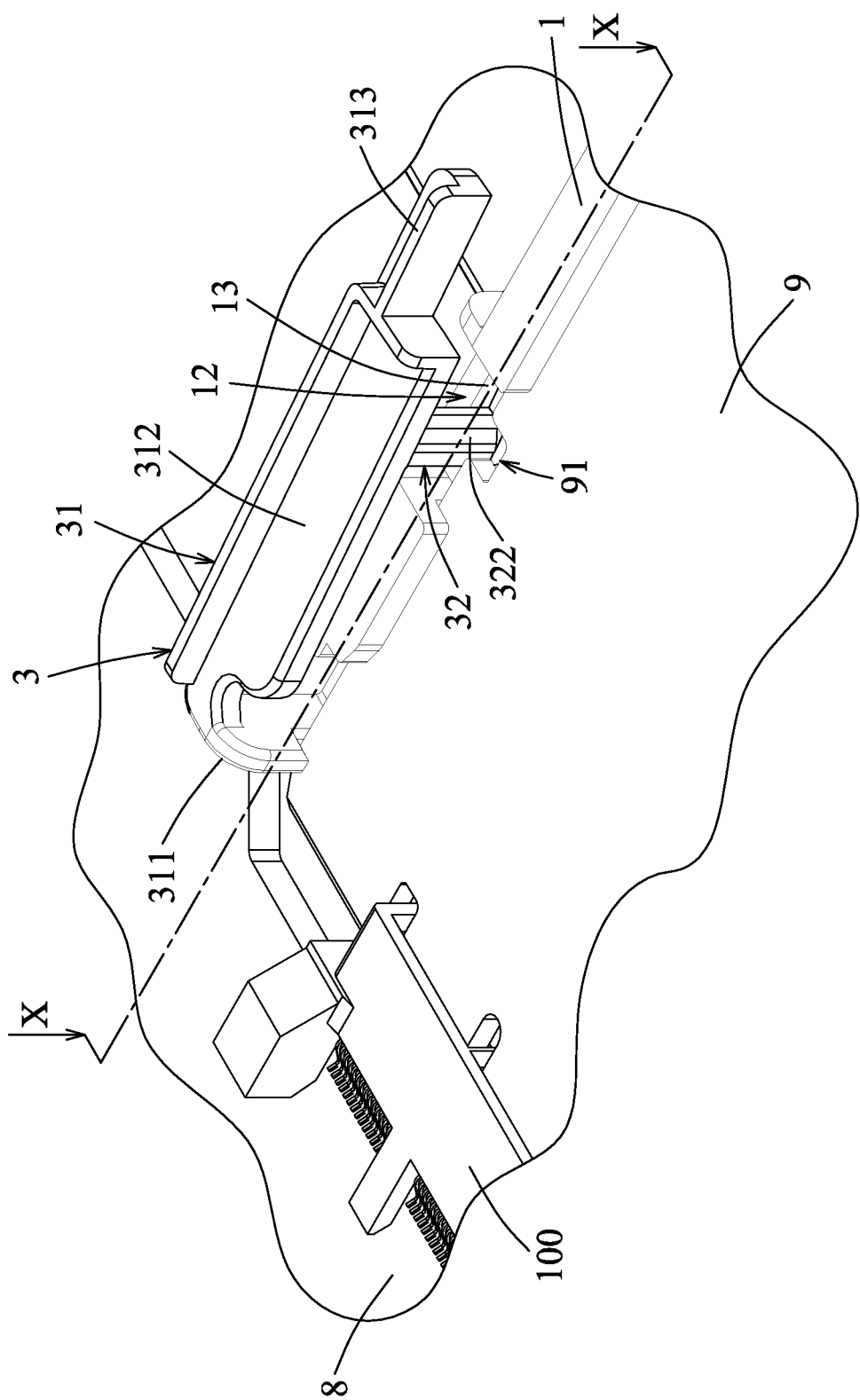
Figure 10:
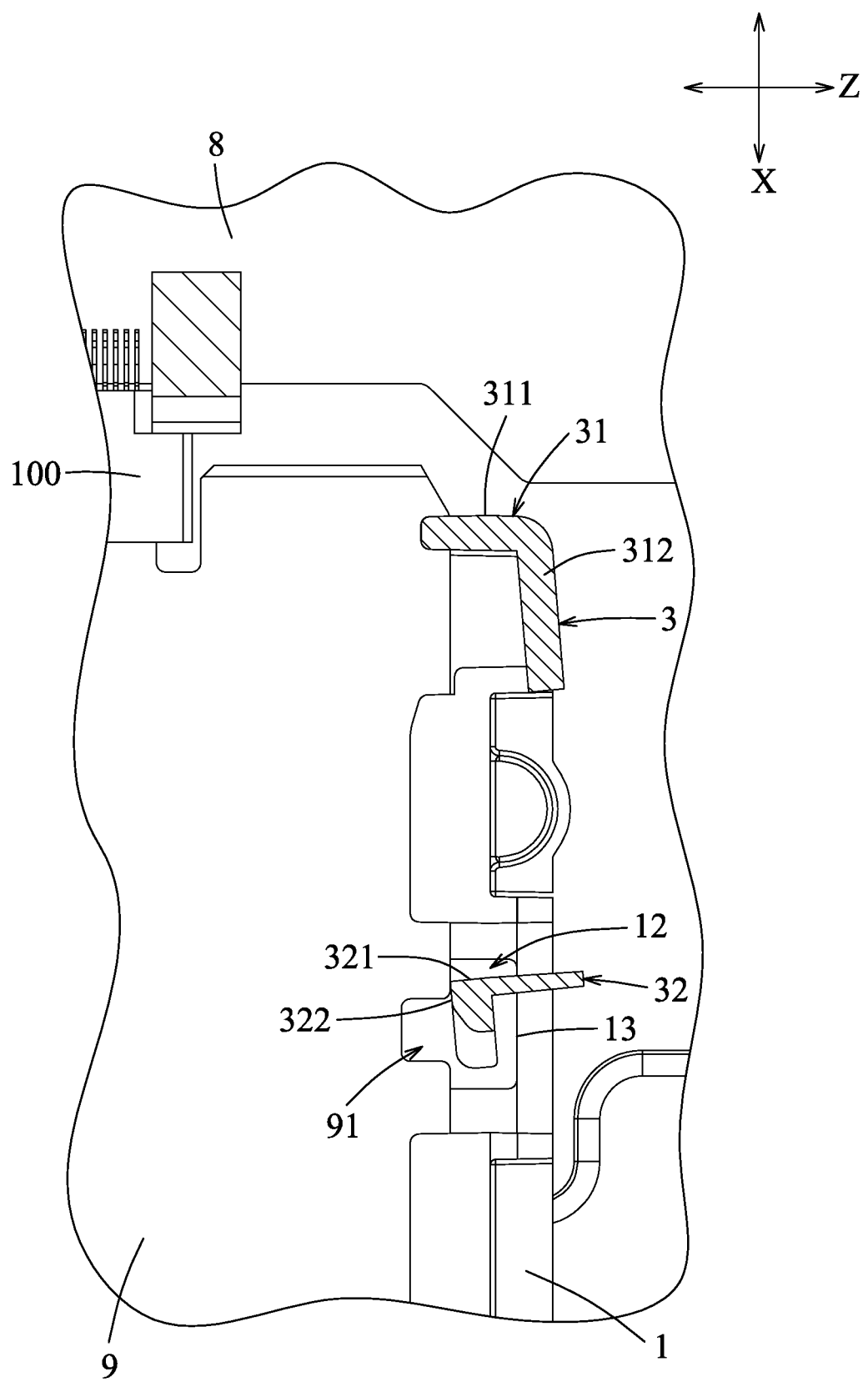
FIG. 10 is a sectional view taken along line X-X of FIG. 9.
Figure 11:
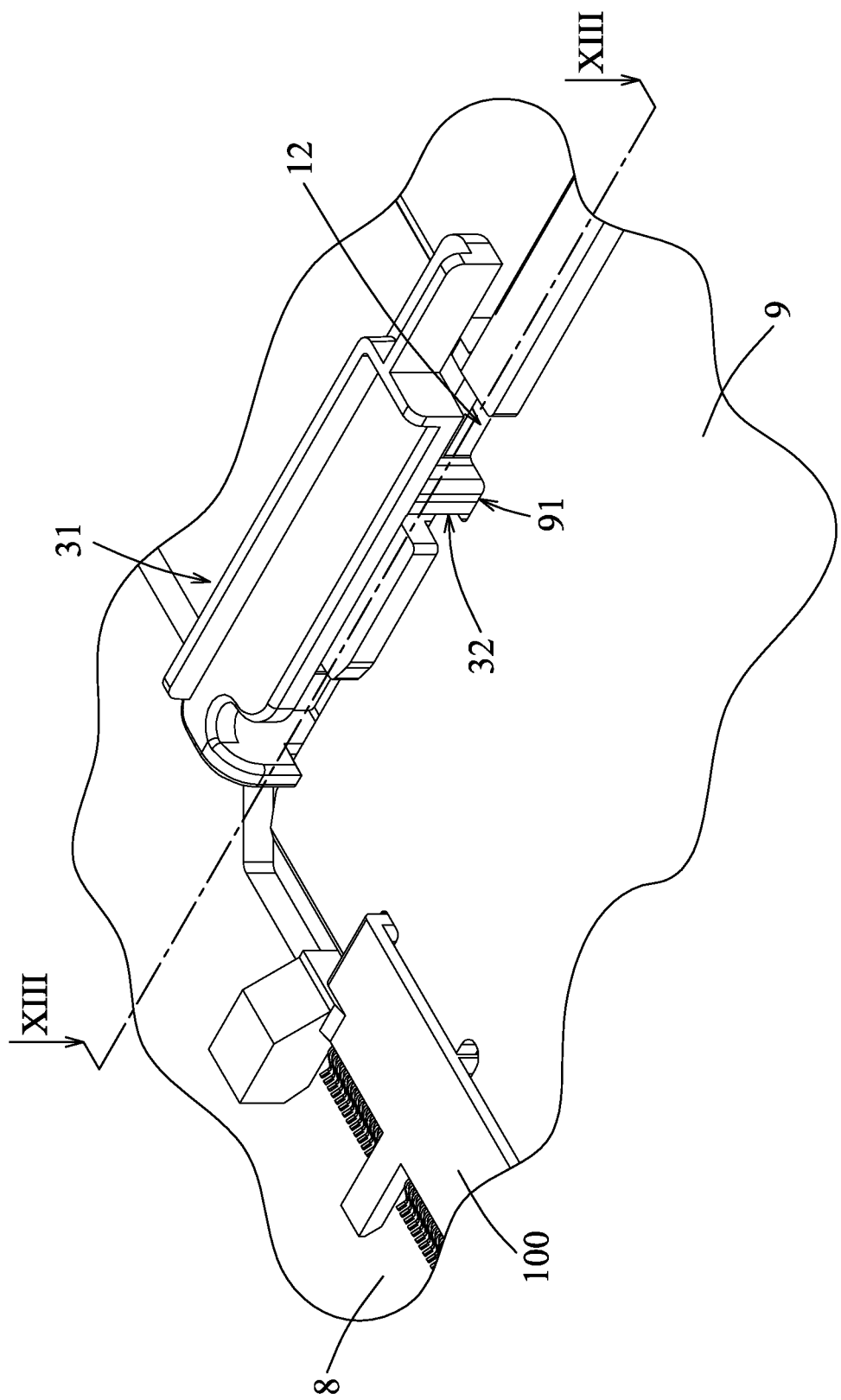
FIG. 11 is an enlarged view of a portion of FIG. 1.
Figure 12:
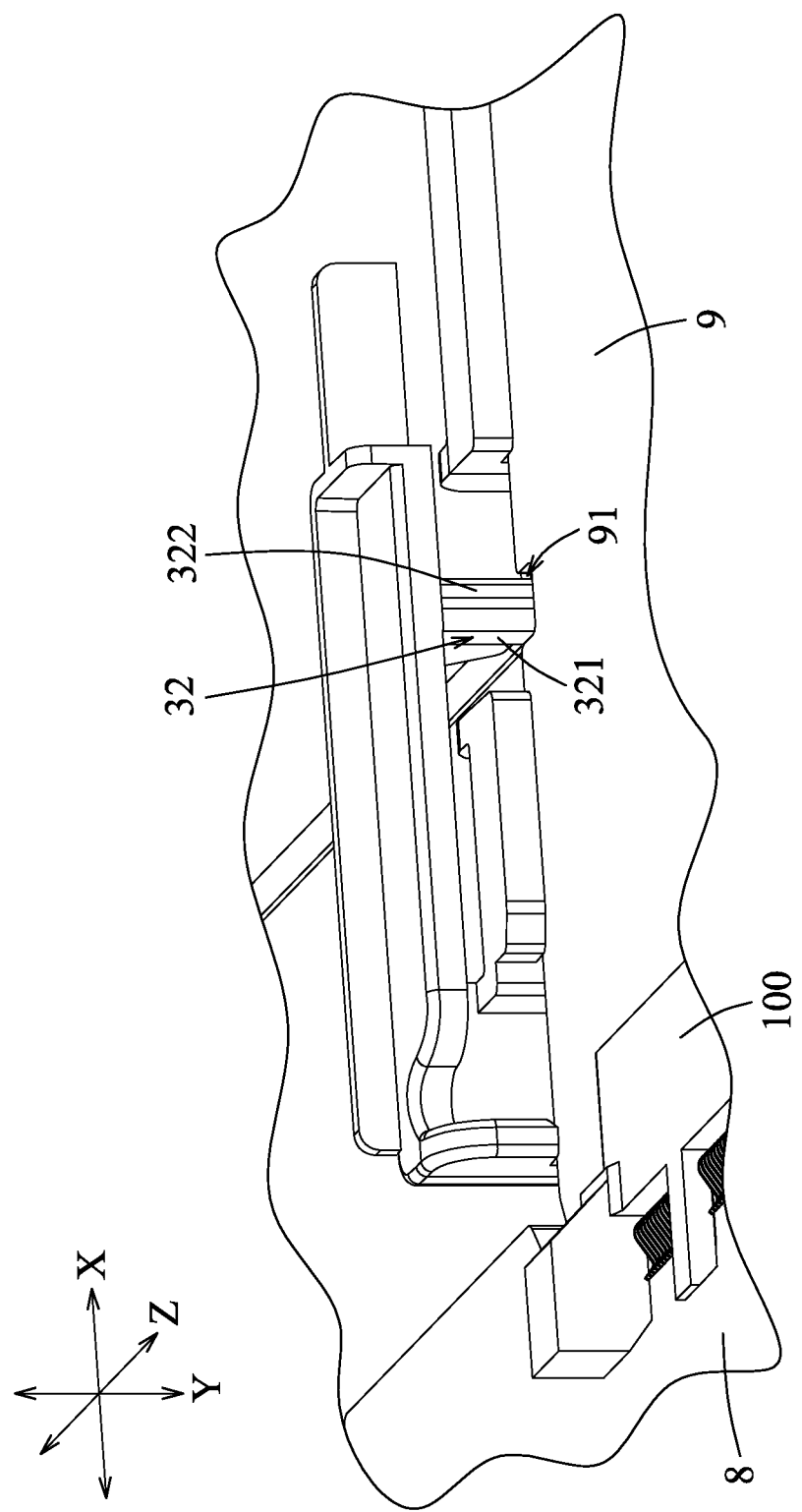
FIG. 12 is an enlarged view similar to FIG. 11, taken from another angle.
Figure 13:
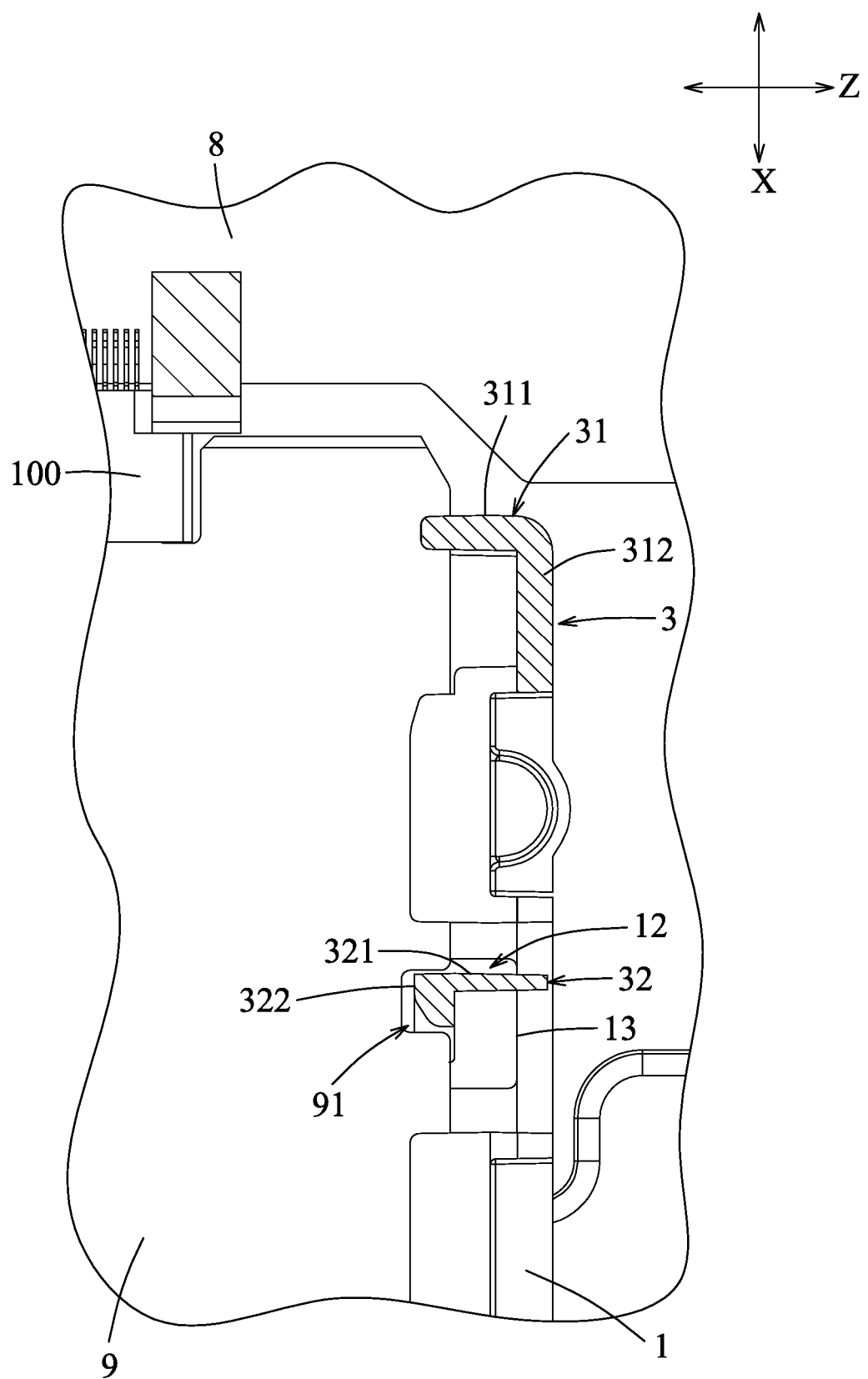
FIG. 13 is a sectional view taken along line XIII-XIII of FIG. 11.

With reference to FIG. 3 and FIGS. 8 to 13, the latch portion 32 is connected with and extends from the extension section 312 toward the first guiderail 1 and through the slot 12 to be elastically displaceable in the left-right direction (Z) or in the up-down direction (Y). As shown in FIG. 11, the latch portion 32 is configured to be elastically displaced to a locking position, where the latch portion 32 is disposed in the card accommodation space 4 through the slot 12 to engage in the notch 91 when the electronic card 9 is inserted into the card connector 100 so as to prevent disengagement of the electronic card 9 from the card connector 100. As shown in FIGS. 12 and 13, the latch portion 32 has an abutting wall 321 which extends in the left-right direction (Z) and which faces the connecting section 311, and a sloped wall 322 which extends forwardly from and is inclined relative to the abutting wall 321. When the electronic card 9 is inserted into the card connector 100, the abutting wall 321 is in abutting engagement with an inner wall of the notch 91 of the electronic card 9 to prevent the disengagement of the electronic card 9 from the card connector 100. The sloped wall 322 is in the form of an arcuate and smooth surfaced wall, and abuts against and is biased by the side edge of the electronic card 9 during sliding insertion of the electronic card 9 into the first and second guiderails 1, 2 in a mounting direction of the electronic card 9, i.e., in the front-rear direction (X), to elastically displace the latch portion 32 in the left-right direction (Z) (rightwardly in this embodiment) along with the extension section 312 to an unlocking position, where the latch portion 32 is retracted away from the card accommodation space 4, as shown in FIGS. 9 and 10.

In mounting and inserting the electronic card 9 into the card connector 100, as shown in FIG. 3, the right and left side edges of the electronic card 9 are respectively aligned with the first channel 11 and the second channel 21, and the electronic card 9 is moved rearwardly along the first and second channels 11, 21 to bring the front edge of the electronic card 9 to reach the front side of the latch portion 32, as shown in FIG. 8. Subsequently, as shown in FIG. 9, the electronic card 9 is moved rearwardly to have the side edge thereof moved over the sloped wall 322 to press the latch portion 32 along with the extension section 312 to displace rightwardly with the connecting section 311 as a fulcrum and to generate a biasing force when the side edge abuts against the latch portion 32. Finally, as shown in FIG. 11, when the notch 91 of the electronic card 9 is aligned with the latch portion 32 in the slot 12, the latch portion 32 is disengaged from the electronic card 9 and elastically moved by the biasing force to return to the locking position to engage the notch 91, whereby the electronic card 9 is retained by the latch portion 32 to prevent movement relative to the card connector 100, and is positioned accurately and stably. Thus, during the sliding insertion of the electronic card 9 into the card connector 100, the electronic card 9 can be moved smoothly over the latch portion 32 to a desired mounting position without the need to operate the operating portion 31, and the latch portion 32 can be "automatically" engaged in the notch 91 of the electronic card 9 for auto-locking the electronic card 9 to the card connecting assembly, which simplifies the mounting process of the electronic card 9 to the card connector 100 and reduces the production costs. Moreover, with the latch portion 32 engaged in the notch 91 of the electronic card 9, the electronic card 9 can be retained firmly and prevented from movement even when an external force is exerted thereon. In this embodiment, with the latch portion 32 engaged in the notch 91 to restrict movement of the electronic card 9, the card connecting assembly can pass the test that the pulling force greater than 8 kgf is exerted to the electronic card 9.

When it is desired to remove the electronic card 9 from the card connector 100, the handgrip 313 or the extension section 312 is pulled in a direction away from the first guiderail 1 to displace and retract the latch portion 32 from the notch 91. Subsequently, the electronic card 9 is moved forwardly and removed from the electronic card mounting structure 200.

With reference to FIGS. 3, 7 and 9, specifically, the first guiderail 1 has a slot wall 13 which extends in the up-down direction (Y) to border the slot 12 and which faces the second guiderail 2. Also, as shown in FIG. 7, the latch portion 32 has a length (L1) measured between a lower end thereof and a lower side of the extension section 312 and larger than a length (L2) measured between an upper end of the slot wall 13 and the lower side of the extension section 312. Thus, when the latch portion 32 is displaced in the left-right direction (Z) away from the second guiderail 2 to the unlocking position, the latch portion 32 is stopped by the slot wall 13 to avoid excess displacement of the latch portion 32 and breakage of the operating portion 31.

Figure 16:
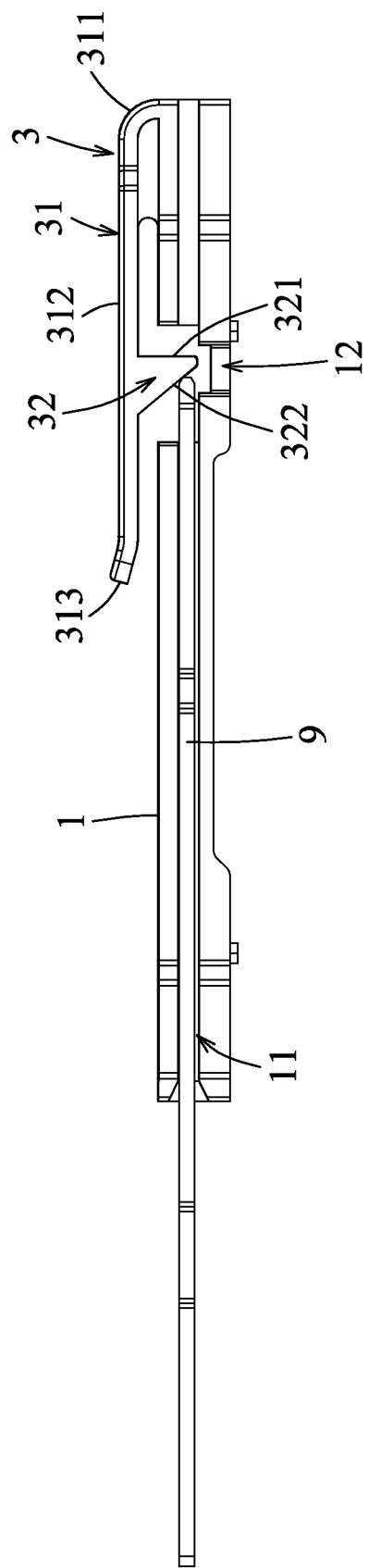
FIGS. 16 and 17 are right side views of the embodiment in the state when an electronic card is being inserted into the card connecting assembly.
Figure 18:
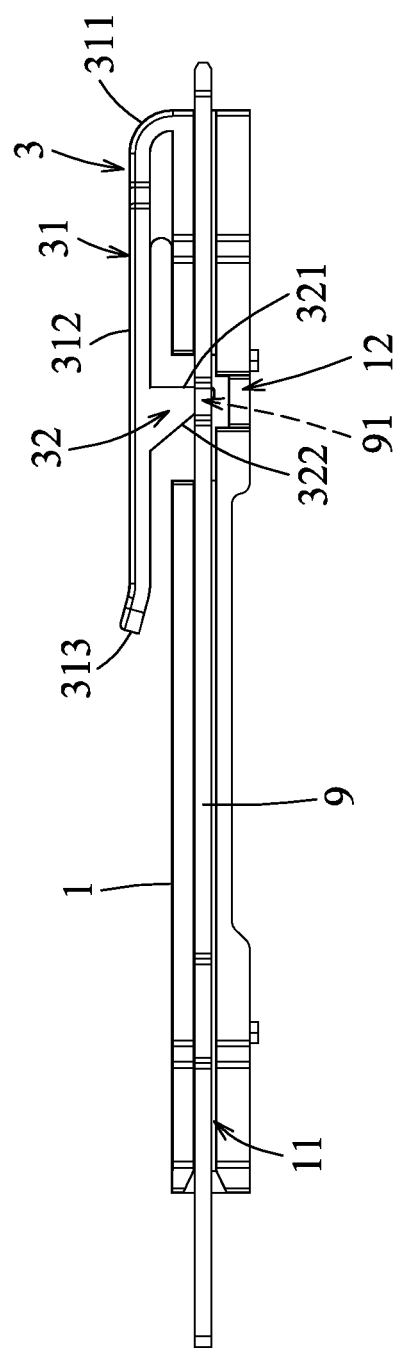
FIG. 18 is a right side view illustrating in the state when the electronic card is fully inserted into the card connecting assembly.

With reference to FIGS. 14 to 18, in another embodiment, the latch portion 32 has an abutting wall 321 which extends in the up-down direction (Y) and which faces the connecting section 311, and a sloped wall 322 which extends forwardly from and is inclined relative to the abutting wall 321. Thus, as shown in FIGS. 16 and 17, during the sliding insertion of the electronic card 9 into the first and second guiderails 1, 2, the side edge of the electronic card 9 is pressed and slides along the sloped wall 322 so that the latch portion 32 is displaced along with the extension section 312 by the side edge of the electronic card 9 in the up-down direction (Y) to be retracted away from the card accommodation space 4 and the slot 12 (an upward displacement in this embodiment) to displace the latch portion 32 to the unlocking position. That is, the sloped wall 322 abuts against and is biased upwardly by the side edge of the electronic card 9, and the operating portion 31 is automatically and elastically displaced in the up-down direction. Hence, the latch portion 32 is returned to the locking position and engaged in the notch 91 of the electronic card 9 when the notch 91 is aligned with the abutting wall 321 to permit abutting engagement of the abutting wall 321 with an inner wall of the notch 91, as shown in FIG. 18.

In the embodiment shown in FIGS. 4 to 7, the handgrip 313 has a width in the left-right direction (Z) which is smaller than a width of the extension section 312 in the left-right direction (Z) for facilitating gripping. In the embodiment shown in FIGS. 14 to 18, the handgrip 313 has a width similar to that of the extension section 312, and is bent upwardly from the extension section 312 to facilitate gripping.

As illustrated, with the latch portion 32 being engageable or disengageable with the notch 91 through operation, the electronic card 9 is reliably and stably retained to the card connector 100 to prevent movement relative to the card connector 100 and renders the mounting of the electronic card 9 efficient, accurate and firm. Moreover, with the latch mechanism 3 integrally formed with the first guiderail 1, the number of molds used during manufacturing is reduced which reduces the manufacturing cost. Assembling steps of the electronic card mounting structure 200 to a case 300 can be simplified and the manufacturing cost can be reduced.

In implementations, an electronic card mounting structure for pluggably inserting an electronic card into a card connector on a circuit board, the electronic card having at least one notch formed at a side edge thereof, including a first guiderail and a second guiderail respectively disposed at a right side and a left side two sides of the card connector in a left-right direction to define a card accommodation space therebetween such that the electronic card is slidably insertable into said first and second guiderails along the side edges to be further inserted into the card connector, wherein said first guiderail has a first channel which is recessed from a side surface facing said second guiderail for slidable insertion of the side edge of the electronic card thereinto, and a slot which extends to be in communication with said first channel and which is aligned with the notch when the electronic card is inserted into the card connector; and a latch mechanism integrally formed and elastically connected with said first guiderail, said latch mechanism including an operating portion and a latch portion, said latch portion being configured to be elastically displaced between a locking position, where said latch portion is disposed in said card accommodation space for engagement in the notch of the electronic card, and an unlocking position, where said latch portion is retracted away from said card accommodation space, by the side edge of the electronic card during sliding insertion of the electronic card into the said first and second guiderails to permit movement of the side edge over said latch portion and to generate a biasing force when the side edge abuts against said latch portion, said operating portion being connected with said latch portion and being operably and elastically moved away from said card accommodation space in a direction that is away from said first guiderail to displace said latch portion from the locking position to the unlocking position so as to remove said latch portion from the notch, said operating portion having a connecting section which is connected with and extends from said first guiderail in a direction that is transverse to a mounting direction of the electronic card to the card connector, and an extension section which is connected with and extends from said connecting section to be spaced apart from and along said first guiderail, said latch portion being connected with and extending from said extension section toward said first guiderail and through said slot so as to be displaced by the biasing force to engage in the notch through said slot in the locking position, wherein said operating portion is operated to elastically displace said extension section with said connecting section as a fulcrum to retract said latch portion from the notch, wherein said first guiderail extends in a front-rear direction to permit the mounting direction of the electronic card to be the front-rear direction, and wherein, during the sliding insertion of the electronic card into the said first and second guiderails, said latch portion is displaced along with said extension section by the side edge of the electronic card in an up-down direction that is transverse to both the front-rear direction and the left-right direction to be retracted away from said card accommodation space and said slot.

In implementations, card connecting assembly mountable on a circuit board for insertion of an electronic card, the electronic card having at least one notch formed at a side edge thereof, including a card connector disposed on the circuit board; and an electronic card mounting structure including a first guiderail, a second guiderail and a latch mechanism, said first guiderail and said second guiderail being respectively disposed at two sides a right side and a left side of said card connector in a left-right direction to define a card accommodation space therebetween such that the electronic card is slidably insertable into said first and second guiderails along the side edges to be further inserted into said card connector, the first guiderail having a first channel which is recessed from a side surface facing the second guiderail for slidable insertion of the side edge of the electronic card thereinto, and a slot which extends to be in communication with the first channel and which is aligned with the notch when the electronic card is inserted into the card connector, said latch mechanism being integrally formed and elastically connected with said first guiderail, said latch mechanism including an operating portion and a latch portion, said latch portion being configured to be elastically displaced from a locking position, where said latch portion is disposed in said card accommodation space for engagement in the notch of the electronic card, and an unlocking position, where said latch portion is retracted away from said card accommodation space, by the side edge of the electronic card during sliding insertion of the electronic card into the said first and second guiderails to permit movement of the side edge over said latch portion and to generate a biasing force when the side edge abuts against said latch portion, said operating portion being connected with said latch portion and being operably and elastically moved away from said card accommodation space in a direction that is away from said first guiderail to displace said latch portion from the locking position to the unlocking position so as to remove said latch portion from the notch, the operating portion having a connecting section which is connected with and extends from the first guiderail in a direction that is transverse to a mounting direction of the electronic card to the card connector, and an extension section which is connected with and extends from the connecting section to be spaced apart from and along the first guiderail, the latch portion being connected with and extending from the extension section toward the first guiderail and through the slot so as to be displaced by the biasing force to engage in the notch through said slot in the locking position, wherein the operating portion is operated to elastically displace the extension section with the connecting section as a fulcrum to retract the latch portion from the notch, wherein the first guiderail extends in a front-rear direction to permit the mounting direction of the electronic card to be the front-rear direction, and wherein, during the sliding insertion of the electronic card into the first and second guiderails, the latch portion is displaced along with the extension section by the side edge of the electronic card in an up-down direction that is transverse to both the front-rear direction and the left-right direction to be retracted away from the card accommodation space and the slot.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An electronic card mounting structure for pluggably inserting an electronic card into a card connector on a circuit board, the electronic card having at least one notch formed at a side edge thereof, comprising:
   a first guiderail and a second guiderail respectively disposed at a right side and a left side of the card connector in a left-right direction to define a card accommodation space therebetween such that the electronic card is slidably insertable into said first and second guiderails along the side edges to be further inserted into the card connector, wherein said first guiderail has a first channel which is recessed from a side surface facing said second guiderail for slidable insertion of the side edge of the electronic card thereinto, and a slot which extends to be in communication with said first channel and which is aligned with the notch when the electronic card is inserted into the card connector; and a latch mechanism integrally formed and elastically connected with said first guiderail, said latch mechanism including an operating portion and a latch portion, said latch portion being configured to be elastically displaced between a locking position, where said latch portion is disposed in said card accommodation space for engagement in the notch of the electronic card, and an unlocking position, where said latch portion is retracted away from said card accommodation space, by the side edge of the electronic card during sliding insertion of the electronic card into the said first and second guiderails to permit movement of the side edge over said latch portion and to generate a biasing force when the side edge abuts against said latch portion, said operating portion being connected with said latch portion and being operably and elastically moved away from said card accommodation space in a direction that is away from said first guiderail to displace said latch portion from the locking position to the unlocking position so as to remove said latch portion from the notch, said operating portion having a connecting section which is connected with and extends from said first guiderail in a direction that is transverse to a mounting direction of the electronic card to the card connector, and an extension section which is connected with and extends from said connecting section to be spaced apart from and along said first guiderail, said latch portion being connected with and extending from said extension section toward said first guiderail and through said slot so as to be displaced by the biasing force to engage in the notch through said slot in the locking position, wherein said operating portion is operated to elastically displace said extension section with said connecting section as a fulcrum to retract said latch portion from the notch, wherein said first guiderail extends in a front-rear direction to permit the mounting direction of the electronic card to be the front-rear direction, and wherein, during the sliding insertion of the electronic card into the said first and second guiderails, said latch portion is displaced along with said extension section by the side edge of the electronic card in an up-down direction that is transverse to both the front-rear direction and the left-right direction to be retracted away from said card accommodation space and said slot.

2. The electronic card mounting structure of claim 1, wherein said latch portion has an abutting wall which extends in the up-down direction and which faces said connecting section, and a sloped wall which extends forwardly from and is inclined relative to said abutting wall such that, during the sliding insertion of the electronic card into the said first and second guiderails, said sloped wall abuts against and is biased in the up-down direction by the side edge of the electronic card to displace said latch portion to the unlocking position, and is returned to the locking position when the notch of the electronic card is aligned with said abutting wall to permit abutting engagement of said abutting wall with an inner wall of the notch.

3. The electronic card mounting structure of claim 1, wherein said operating portion further has a handgrip connected with and extending from said extension section in the front-rear direction away from said connecting section, said handgrip being bent upwardly from said extension section.

4. A card connecting assembly mountable on a circuit board for insertion of an electronic card, the electronic card having at least one notch formed at a side edge thereof, comprising:

a card connector disposed on the circuit board; and an electronic card mounting structure including a first guiderail, a second guiderail and a latch mechanism, said first guiderail and said second guiderail being respectively disposed at a right side and a left side of said card connector in a left-right direction to define a card accommodation space therebetween such that the electronic card is slidably insertable into said first and second guiderails along the side edges to be further inserted into said card connector, the first guiderail having a first channel which is recessed from a side surface facing the second guiderail for slidable insertion of the side edge of the electronic card thereinto, and a slot which extends to be in communication with the first channel and which is aligned with the notch when the electronic card is inserted into the card connector, said latch mechanism being integrally formed and elastically connected with said first guiderail, said latch mechanism including an operating portion and a latch portion, said latch portion being configured to be elastically displaced from a locking position, where said latch portion is disposed in said card accommodation space for engagement in the notch of the electronic card, and an unlocking position, where said latch portion is retracted away from said card accommodation space, by the side edge of the electronic card during sliding insertion of the electronic card into the said first and second guiderails to permit movement of the side edge over said latch portion and to generate a biasing force when the side edge abuts against said latch portion, said operating portion being connected with said latch portion and being operably and elastically moved away from said card accommodation space in a direction that is away from said first guiderail to displace said latch portion from the locking position to the unlocking position so as to remove said latch portion from the notch, the operating portion having a connecting section which is connected with and extends from the first guiderail in a direction that is transverse to a mounting direction of the electronic card to the card connector, and an extension section which is connected with and extends from the connecting section to be spaced apart from and along the first guiderail, the latch portion being connected with and extending from the extension section toward the first guiderail and through the slot so as to be displaced by the biasing force to engage in the notch through said slot in the locking position, wherein the operating portion is operated to elastically displace the extension section with the connecting section as a fulcrum to retract the latch portion from the notch, wherein the first guiderail extends in a front-rear direction to permit the mounting direction of the electronic card to be the front-rear direction, and wherein, during the sliding insertion of the electronic card into the first and second guiderails, the latch portion is displaced along with the extension section by the side edge of the electronic card in an up-down direction that is transverse to both the front-rear direction and the left-right direction to be retracted away from the card accommodation space and the slot.

5. The card connecting assembly of claim 4, wherein said latch portion has an abutting wall which extends in the up-down direction and which faces said connecting section, and a sloped wall which extends forwardly from and is inclined relative to said abutting wall such that, during the sliding insertion of the electronic card into the said first and second guiderails, said sloped wall abuts against and is biased in the up-down direction by the side edge of the electronic card to displace said latch portion to the unlocking position, and is returned to the locking position when the notch of the electronic card is aligned with said abutting wall to permit abutting engagement of said abutting wall with an inner wall of the notch.

6. The card connecting assembly of claim 4, wherein said operating portion further has a handgrip connected with and extending from said extension section in the front-rear direction away from said connecting section, said handgrip being bent upwardly from said extension section.

* * * * *